W. N. RIEGER AND W. D. CANDEE.
PIPE REINFORCEMENT AND COUPLING THEREFOR.
APPLICATION FILED AUG. 18, 1917.

1,305,668.

Patented June 3, 1919.

WITNESSES

Walter N. Rieger
William D. Candee   INVENTORS

BY

ATTORNEY

UNITED STATES PATENT OFFICE.

WALTER N. RIEGER AND WILLIAM D. CANDEE, OF TAFT, CALIFORNIA.

PIPE-REINFORCEMENT AND COUPLING THEREFOR.

1,305,668.   Specification of Letters Patent.   Patented June 3, 1919.

Application filed August 18, 1917. Serial No. 186,973.

*To all whom it may concern:*

Be it known that we, WALTER N. RIEGER and WILLIAM D. CANDEE, citizens of the United States, residing at Taft, in the county of Kern and State of California, have invented a new and useful Pipe-Reinforcement and Coupling Therefor, of which the following is a specification.

The invention relates to a pipe reinforcement, and more particularly to the class of reinforced ends and coupling therefor.

The primary object of the invention is the provision of a structure of this character wherein the pipe reinforcement is effected by a band or nipple placed interiorly or exteriorly of the pipe end and thereafter said pipe being swaged to reduce the same, preferably of outwardly tapered formation, the band or nipple being welded to the pipe end, while the collar is shaped to the external surfaces of the meeting pipe ends having the reinforcement, the pipe ends and the collar being correspondingly threaded for the detachable connection of said pipe ends within the collar, and in this connection the extremities of the pipe will abut each other, while the collar will abut at its ends the adjacent portions of the pipe, thereby assuring a perfectly tight joint between the reinforced pipe ends.

Another object of the invention is the provision of a pipe reinforcement and a connecting collar or sleeve which are novel in form to assure maximum strength in the coupling of pipe sections together, the pipe ends being threaded to a templet, and likewise the collar or sleeve is also threaded to a templet, so that when the joint is made between pipe sections the ends of the pipe ends will abut and the shoulders formed on the pipe ends and the extremities of the collar will abut together.

The invention will be best understood from a consideration of the following detail description, taken in connection with the accompanying drawing forming part of this specification, with the further understanding that while the drawing shows a practical form of the invention, the latter is not confined to any strict conformity with the showing in the drawing, but may be changed and modified so long as such changes and modifications come within the scope of the appended claims.

In the accompanying drawing.

Similar reference characters indicate corresponding parts throughout the several views in the drawing.

Figure 1:
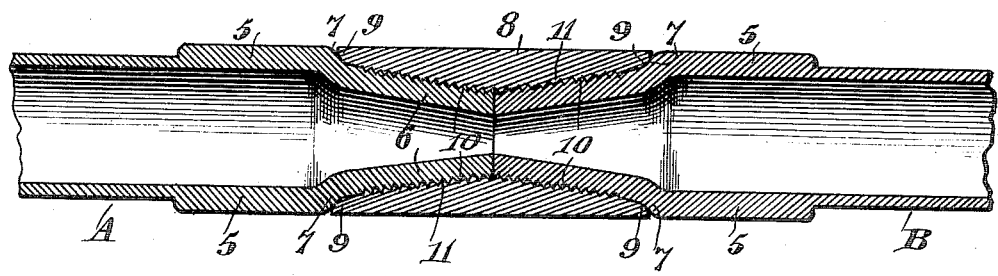
Figure 1 is a fragmentary vertical longitudinal sectional view through reinforced pipe ends and the connecting sleeve, the pipe reinforcements being exteriorly of said pipe ends.
Figure 2:
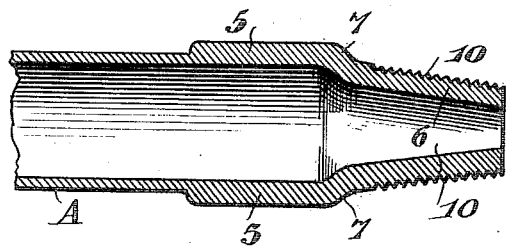
Fig. 2 is a view similar to Fig. 1, showing one of the pipe ends removed.

Referring to Figs. 1 and 2 of the drawing in detail, A and B designate complementary pipes each being of any desirable length, and the ends of these pipes are normally of external and internal diameters corresponding to the normal diameter of the pipe throughout its length, while fitted upon each pipe end is a band or nipple which is welded thereto in any ordinary and well known manner to form the reinforced pipe end, which from a point beginning at about midway its length, is reduced by swaging the same, forming the outwardly tapered portion 6, with an inclined abutment shoulder 7 at the junction of the tapered portion and the cylindrical portion 5. It will be noted that the thickness of the walls of the reinforced pipe end is the same from the cylindrical portion to the tapered portion.

The angle of inclination of the shoulder 7 to the longitudinal axis of the pipe is greater than the angle of inclination of the tapered portion 6 to said axis.

To detachably connect the reinforced pipe ends, there is provided a coupling collar or sleeve 8 which is formed with an internal diameter correspondingly shaped and tapered to both of the reduced portions 6 of the pipe ends, the collar or sleeve being of a length equal to both the tapered portions 6, so that on the engagement of the pipe ends within the collar or sleeve, the extremities of the portions 6 will abut each other, while the ends 9 of the collar or sleeve constitute shoulders which match and will abut the shoulders 7 of the pipe ends as is clearly shown in Fig. 1 of the drawing.

The pipe ends at the outwardly tapered portions 6 are externally threaded at 10, the inner end of the thread on each portion 6 terminating a distance removed from the shoulder 7, while the collar 8 is formed with internal threads 11 for engagement with the threads on the tapered portions 6 of the pipe ends, the threads upon the latter being formed to a templet, and likewise the threads internally of the collar or sleeve 8 are formed to a templet, so that when the joint between the pipe ends is taken up, the meeting extremities of the portions 6 of said pipe ends will abut each other, and the ends of the collar or sleeve 8 will abut the shoulder 7, and in this manner the coupling of the pipes will be effected to form a strong, tight and reinforced joint with an external surface of uniform size.

Figure 3:
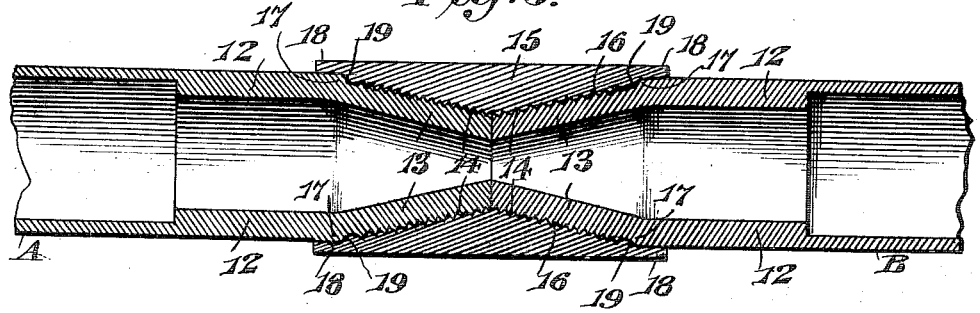
Fig. 3 is a view similar to Fig. 1 showing a slight modification of the invention, the reinforcements of the pipe ends being interiorly thereof.

In Fig. 3 there is shown a modification of the invention, wherein each pipe, which is initially of uniform cross sectional diameter, has inserted in its end a band or nipple which is welded thereto, and thereafter the pipe end reinforced thereby, is swaged from a point beginning at about midway its length to provide an outwardly tapered portion 13 having external threads 14 for detachable engagement in a collar or sleeve 15, which has its internal diameter correspondingly shaped to both tapered portions 13 of the two pipe ends and is formed with internal threads 16 for engagement with the threads 14 on the tapered portions 13 of said pipe ends. The retaining portion 12 of the pipe end is cylindrical in shape. The threads 14 terminate at the wider end of the tapered portion 13 spaced from the external shoulders 17, while the threads 16 within the collar or sleeve 15 terminate spaced from the ends of said collar or sleeve, so that these ends 18 of the latter overlap the shoulders 17 on the pipe ends for the abutment of shoulders 19 of said sleeve or collar 15 with the shoulders 17, and also the abutment of the extremities of the tapered portions 13 with each other when the pipes are joined, and in this manner the threads 14 and 16 on the pipe ends and in the sleeve or collar will be relieved of undue strain when the joint is made, and thereby giving longevity to the threads.

It will be noted that in both forms of invention the pipe has a reinforced end which is formed by thickening the walls thereof, a portion of the reinforcement extending back from the extreme end, being reduced in diameter and tapered toward the extremity, said tapered portion being exteriorly threaded while the remaining portion of the reinforcement is cylindrical in shape and joins with the tapered portion in a shoulder which is unthreaded. The drawing only shows one end of the pipe so constructed, but, of course, it will be understood that in a length of pipe, both ends will be formed in a similar manner.

What we claim is:

1. A pipe having a reinforced end integral with the body of the pipe and formed by a uniform thickening of the walls of the pipe and comprising a cylindrical portion next to the body of the pipe, a taper portion extending to the extremity of the pipe and of smaller diameter at its large end than the cylindrical portion, and an intermediate portion joining the large end of the taper portion with the cylindrical portion and gradually expanding from the taper portion to the cylindrical portion, said taper portion being exteriorly screw-threaded.

2. The combination with pipes each having reinforced ends formed by a uniform thickening of the walls thereof, said thickened walls each comprising a cylindrical portion next to the body of the pipe, a tapered portion remote from the body of the pipe and of less diameter at its large end than the cylindrical portion and also exteriorly screw-threaded, and a plain inclined shoulder joining the large end of the taper portion with the adjacent end of the cylindrical portion, of a coupling sleeve interiorly tapered and threaded from a mid-point toward the ends with the threads stopping short of the ends and beyond the threaded portions having plain or smooth tapered inner walls forming inclined shoulders to abut the inclined shoulders of the pipes.

3. A pipe with a uniformly thickened end portion tapering from a point intermediate of the length of the thickened portion to the extremity of the pipe and threaded on the exterior of the tapered portion, in combination with a coupling sleeve interiorly tapered and threaded from opposite ends to receive the tapered reinforced ends of two adjoining pipes.

4. A pipe with a uniformly thickened end portion tapering from a point intermediate of the length of the thickened portion to the extremity of the pipe and threaded on the exterior of the tapered portion, in combination with a coupling sleeve interiorly tapered and threaded from opposite ends to receive the tapered reinforced ends of two adjoining pipes, the pipe where the tapered portion joins the remainder of the reinforced portion and the coupling beyond the threaded portion being formed into matching inclined or tapered abutments constituting meeting shoulders.

In testimony that we claim the foregoing as our own we have hereto affixed our signatures in the presence of two witnesses.

WALTER N. RIEGER.
WILLIAM D. CANDEE.

Witnesses:
MARY MURPHY,
M. E. CRIST.